(12) United States Patent
Schmoock

(10) Patent No.: US 6,524,698 B1
(45) Date of Patent: Feb. 25, 2003

(54) FLUID IMPERMEABLE FOIL

(76) Inventor: Helmuth Schmoock, Büchener Weg 121, Lauenburg (DE), D-2058

( * ) Notice: Subject to any disclaimer, the term of this patent is extended or adjusted under 35 U.S.C. 154(b) by 557 days.

(21) Appl. No.: 09/048,533

(22) Filed: Mar. 25, 1998

Related U.S. Application Data

(63) Continuation-in-part of application No. 08/858,901, filed on May 19, 1997, now abandoned, which is a continuation of application No. 08/633,931, filed on Apr. 17, 1996, now abandoned, which is a continuation of application No. 08/067,993, filed on May 27, 1993, now abandoned, which is a continuation-in-part of application No. 07/762,751, filed on Sep. 20, 1991, now abandoned.

(30) Foreign Application Priority Data

Sep. 27, 1990 (DE) .......................................... 40 30 534
Feb. 8, 1991 (DE) .......................................... 41 03 800

(51) Int. Cl.$^7$ ................................................ B32B 15/04
(52) U.S. Cl. ..................... 428/336; 428/35.3; 428/35.4; 428/35.8; 428/36.6; 428/457; 428/458; 428/461; 428/465; 428/467; 427/250; 427/255.6; 427/255.7
(58) Field of Search .............................. 428/35.3, 35.4, 428/35.8, 35.9, 36.6, 215, 336, 457, 458, 461, 464, 465, 467, 474.4, 480, 484, 492, 500; 427/250, 255.6, 255.7

(56) References Cited

U.S. PATENT DOCUMENTS

| | | | |
|---|---|---|---|
| 3,118,781 A | 1/1964 | Downing | 117/33.3 |
| 3,916,048 A | 10/1975 | Walles | 428/35 |
| 4,107,380 A | 8/1978 | Wiesman | 428/327 |
| 4,629,640 A | 12/1986 | Akao | 428/35 |
| 4,787,506 A | 11/1988 | Akao | 206/395 |
| 4,818,609 A | 4/1989 | Schmoock | 428/336 |
| 5,043,195 A | 8/1991 | Skrivseth | 428/35.3 |
| 5,165,988 A | 11/1992 | Schaefer | 428/220 |
| 5,260,095 A | 11/1993 | Affinito | 427/124 |
| 5,440,446 A | 8/1995 | Shaw et al. | 361/301.5 |

*Primary Examiner*—Marie Yamnitzky
(74) *Attorney, Agent, or Firm*—Norris McLaughlin & Marcus, P.A.

(57) ABSTRACT

A fluid impermeable foil for use in connection with the wrapping of foodstuffs, cosmetics and other products has a plastic substrate one side of which is coated with a film of metallic material, such as aluminum. The exposed surface of the metallic film is provided with a thin protective layer which contains a wax, a resin, a lubricant and/or another organic material and shields the metallic film from scuffing, corrosion and direct exposure to air and/or moisture. The metallic material of the film is vaporized onto the one side of the substrate, and the organic material of the protective layer is vaporized onto the exposed surface of the film in one or more stages as soon as the vaporization of metallic material upon the substrate is completed.

30 Claims, 4 Drawing Sheets

FLUID IMPERMEABLE FOIL

CROSS-REFERENCE TO RELATED CASE

This is a continuation-in-part of the commonly owned patent application Ser. No. 08/858,901 filed May 19, 1997, now abandoned, which is a continuation of Ser. No. 08/633,931 filed Apr. 17, 1996, abandoned, which is a continuation of Ser. No. 08/067,993 filed May 27, 1993, also abandoned, which is a continuation-in-part of Ser. No. 07/762,751 filed Sep. 20, 1991, also abandoned.

BACKGROUND OF THE INVENTION

The invention relates to improvements in composite sheets in general (hereinafter called foils for short), and more particularly to improvements in foils wherein at least one side of a substrate (e.g., a strip or web of plastic material) is coated with a metallic film, such as a film of aluminum. The invention also relates to a method of making foils which contain metallic films.

Foils of the above outlined character are in widespread use in a number of industries, particularly for the packing or wrapping of foodstuffs and many other products. An advantage of foils which consist of or include metallized substrates is that they enhance the appearance of the packed or wrapped products. Another advantage of such foils is that their initial as well as processing cost is but a fraction of the cost of foils which are made solely of a metallic material, such as aluminum. A further important advantage of foils wherein a usually nonmetallic substrate carries one or more films of metallic material is that they can be provided with one or more additional coats in a simple, time-saving and inexpensive manner.

A drawback of presently known foils wherein a substrate carries one or more films of metallic material is that they are not suitable for a number of important uses. For example, foodstuffs of many kinds, as well as many cosmetic substances, must be packaged or wrapped in such a way that the contents of the package are reliably sealed from the surrounding air as well as from moisture. Heretofore known attempts to produce foils which satisfy such requirements include the utilization of plastic substrates which are laminated with films of a metallic material, such as, aluminum. It is also known to coat metallized plastic foils with layers of polyvinylidene chloride. A drawback of such foils is that they are expensive as well as that they do not satisfy the exacting requirements of environmental protection agencies in many countries. Another drawback of such foils is that they are not fluidtight, or are not sufficiently fluidtight, for a number of purposes. Moreover, their ability to prevent the penetration of gaseous and/or liquid fluids is not predictable and often varies from area to area. While the inability of such conventional foils to prevent the passage of certain gases and/or vaporized liquids might not be detrimental for a number of uses, their permeability to oxygen and/or vapors (such as water vapors) renders them unacceptable for a number of important applications in the food processing and many other industries. Extensive and costly research in this field has so far failed to provide a solution which would broaden the field of application of metallized foils. Moreover, the permeability of conventional foils to oxygen and to certain other fluids increases drastically if their metallic films are permitted to rub against each other and/or against the substrates and/or against the confined product or products.

OBJECTS OF THE INVENTION

An object of the invention is to provide a foil which is not permeable to fluids.

Another object of the invention is to provide a foil which can be put to use as any conventional foil and is further suitable for a number of additional important uses.

A further object of the invention is to provide a foil which meets the requirements of environmental protection agencies and which can be utilized with advantage for the wrapping or packing or other confinement of all kinds of foodstuffs, cosmetics and many other products that should be sealed from the surrounding atmosphere.

An additional object of the invention is to provide a foil which is formed in such a way that its metallic layer or layers are reliably protected from scuffing, corrosion and/or other undesirable influences.

Still another object of the invention is to provide a foil which can be stored in convoluted form without any damage to its metallic film or films.

A further object of the invention is to provide a foil which can be made of readily available materials, at a low cost and in readily available machinery.

Another object of the invention is to provide a foil which is more versatile and safer than heretofore known foils even though its thickness need not exceed, and can be less than, the thickness of conventional foils.

An additional object of the invention is to provide a foil which can readily accept and retain printed matter.

Still another object of the invention is to provide a novel and improved method of making the above outlined foil.

A further object of the invention is to provide a method which renders it possible to reinforce and/or otherwise improve the appearance and/or other desirable characteristics of the basic substrate-metallic film combination in a number of different ways, to a desired extent and in a simple and time-saving manner.

Another object of the invention is to provide a method which renders it possible to convert a basic foil consisting of a substrate and one or more metallic films into a superior foil in a simple, inexpensive and timesaving way.

An additional object of the invention is to provide an apparatus for the practice of the above outlined method.

SUMMARY OF THE INVENTION

One feature of the invention resides in the provision of a foil which comprises a substrate having a first side and a second side, a metallic film which adheres to at least one side of the substrate and has a surface facing away from the one side of the substrate, and a protective layer which overlies and adheres to the entire surface of the film. The layer preferably contains or consists of an organic material which strongly adheres to the surface of the film. Such organic material can have a molecular weight of at least about 10,000 g/mol or a molecular weight of less than about 10,000 g/mol. The organic material can be selected from the group consisting of natural and synthetic resins and natural and synthetic waxes and lubricants. For example, the organic material can contain a resin for lacquers and varnishes, a non-smearing wax or caoutchouc. Furthermore, the organic material can constitute a priming which facilitates the application of printed matter to the protective layer. Even furthermore, the layer is substantially no-smearing.

The layer is preferably thin, most preferably very thin. For example, the layer can have a thickness of about $0.5\mu$ to about $\frac{1}{15,000}$ mm. Such layer is preferably applied to the metallic film while the latter is still devoid of scratches and/or other defects which would render the film permeable to gases. For example, the metallic material of the film can be vaporized onto the one side of the substrate and the organic material of the protective layer can be vaporized onto successive increments of the freshly vaporized film. A metal film is generally considered free of scratches if the film does not have uneven areas which are noticeable in light transmission. For example, in transmission, a foil which has pin windows is covered with small illuminated dots. The lower the number of such mechanical defects in the metal film, the less pervious the foil is to gases. A protective coating made of an organic material which is applied immediately after coating the metal film and which has a high affinity to the metal, reduces the permeability of the foil to gases to 1/10 of that of an unprotected metal film.

The protective layer and the film can jointly constitute a fluidtight coating at the one side of the substrate. Furthermore, the layer can be resistant to corrosion, i.e., it can prevent oxidation of the metallic film.

The layer is preferably made in such a way that its thickness is constant along the entire surface of the film. Furthermore, the protective layer can be resistant to blocking. The organic material of the layer preferably exhibits high affinity for the metallic material of the film, and the layer is preferably made of an imprintable material.

The foil can further include a coating which overlies and adheres to the protective layer. The coating can constitute an extrusion which is crystallized on and uniformly covers the layer.

It is further desirable to make the layer of a physiologically acceptable material and to utilize an odorless material.

The substrate can be made of a material which is selected from the group consisting of polypropylene, polyethylene, polyesters, polyamides, polystyrene and polyvinyl chloride.

The preferably thin layer is or can be made of a material which has a low coefficient of friction, i.e., which has a smooth exposed surface and can move relative to an abutting surface in response to the application of a relatively small force. The term "protective" is intended to denote, among others, that the layer can shield the surface of the metallic film from scuffing.

Another feature of the invention resides in the provision of a method of making a foil of the above outlined character. The method comprises the steps of applying a film of metallic material (e.g., aluminum) to at least one side of a substrate so that the film has a surface which faces away from the substrate, and bonding a protective layer to the surface of the film. The layer can contain an organic material, and the bonding step can include vaporizing the organic material onto the surface of the film.

The method can further comprise the step of convoluting the foil upon completion of the bonding step. The applying step of such method can include vaporizing the metallic material onto the at least one side of the substrate, and the bonding step can include vaporizing the organic material onto the film immediately following the applying step. The organic material can be selected from the group consisting of natural and synthetic resins, and natural and synthetic waxes and lubricants. The film is ready to withstand a force which is applied to it by way of the protective layer as soon as the making of the layer is completed.

The protective layer is preferably thin and its thickness is preferably constant along the entire surface of the film.

The applying step can include vaporizing the metallic material onto the at least one side of the substrate in a vaporizer, and the bonding step can include vaporizing the organic material of the layer onto the surface of the film while the respective portion of the substrate is still in the vaporizer. The organic material of the layer is preferably selected in such a way that it exhibits high affinity for the metallic material of the film.

The high affinity between the plastic material in the vapor phase and the metal in the metal film is due to molecular interactions. After the metal is evaporated on the plastic foil in the form of a metal film, a relatively large surface tension develops in the metal film which can cause the metal film to react strongly to mechanical stress. When the foil with the applied metal film moves across a deflection roller, so-called "pin windows" can form in the highly stressed surface of the metal film which destroy the initial imperviousness of the metal film to gases.

If a protective coating which has a high affinity to the metal film, is evaporated onto the metal film immediately after coating the metal film, then the large surface tension in the metal of the metal film is absorbed due to the high affinity. The metal film then becomes less susceptive to mechanical stress and tends to produce a smaller number of pin windows. The foil onto which the metal film is evaporated, can then be deflected over rollers and wound up without adversely affecting the imperviousness of the metal. The mechanical strength of a 1.5 $\mu$m thick metal film is approximately 2 Newton (N) which is sufficient so that other materials can be laminated or imprinted on the foil after a protective coating is evaporated onto the metal film.

It has not yet been investigated in detail what causes an organic material in the vapor state to have a high affinity to the metal. An extensive array of experiments with potentially useful resins and waxes were conducted and a selection among waxes with a potential for forming protective layers were found. Thus, it was feasible to select organic materials which are capable of reducing the surface tension in the applied metal film. Examined are primarily so-called polar resins which have a stronger adhesion to the metal of the metal film than non-polar resins. It is recommended to test each specific application to find suitable materials which have a high affinity to the metal and which also meet other requirements, such as lamination and imprinting. The greater the required adhesion, the higher the required affinity of the resin to the evaporated metal, and the more careful the selection has to be made. Because the plastic coating is extremely thin, it has excellent durability. The very thin plastic coating also lowers the surface tension, so that the metal surface is more resistant to mechanical stress and does not form very small pin windows (1.4 $\mu$m).

If the layer contains a resin, the bonding step can include heating the resin to vaporization temperature in a vaporizer and contacting the surface of the film with vaporized resin in the vaporizer.

The bonding step can include a plurality of successive stages. The method then preferably further comprises the step of advancing the substrate and the film thereon along a predetermined path, and each stage can include contacting the film with vaporized organic material in successive portions of the path. The contacting steps can include applying a discrete stratum of organic material to the film in each portion of the path so that the application of a next-following stratum begins immediately following completion of application of a preceding stratum. Such method preferably comprises the step of solidifying successively applied strata of the layer, and the contacting steps can include applying each next-following stratum subsequent to start of solidification of the immediately preceding stratum.

Successive stages of the bonding step can be carried out at predetermined intervals, preferably at intervals of 30 to 120 seconds. The duration of the intervals can depend upon the characteristics of the corresponding strata; alternatively, such intervals can be fixed or variable. The arrangement may be such that the duration of intervals increases or decreases from each preceding stage to the next-following stage of the plurality of successive stages. Each stage can involve the application of one and the same material to the film; alternatively, at least one stage can involve the application of a first material and at least one other stage can involve the application of a different second material to the film. For example, one of the materials can be a resin and another material can be a wax. If the stages include three or more successive stages, the bonding step can include alternatingly applying resin and wax during successive stages of such plurality of successive stages.

It is also important that the plastic material is non-smearing. A plastic material is basically non-smearing if the mechanical strength at temperatures to which the packing materials are subjected (−20° C. to +50° C.) is such that the plastic material is not abraded from the surface of the metal film when certain forces are applied. The plastic material adheres immovably to the metal film and does not become detached even in situations where a material which transmits large frictional forces to the protective layer, is rubbed across the protective layer, for example a rubber sponge.

The layer of the foil should also be non-blocking. Non-blocking is attained when the protective coating does not detach from the metal film even when the foil is heavily stressed, for example by repeated buckling or flexing. The tendency for the protective coating to become detached increases with the coating thickness. A thin layer with a coating thickness of $1/15000$ mm is not expected to detach from the metal film even under high stress. Quite important is also the surface quality of the plastic foil to which the metal film is applied. The smoothness of the metal film coated on the foil and the adhesion between the metal film and the plastic coating containing the plastic material with a high affinity to the metal, directly depends on the smoothness of the foil. For example, the polyethylene foil used by the applicant does not block the protective coating. A polypropylene foil provides a blocking affect which is only marginally superior to that provided by the PE foil. The gas-tight foils prepared by the applicant have a negligible blocking effect close to 0.

Also, plastic material used in such application should be "harmless" for humans. Harmless materials are such material that are used as a packaging material according to the BGA regulations in Germany and the FDA regulations in the USA. Plastic materials which fall within these regulatory limits, are selected as suitable plastic materials for forming the protective coating. The regulatory terms mandate that these protective coatings must not be capable of adversely affecting packaged food so as to cause illnesses in people, for example cancer.

A presently preferred embodiment of the method further comprises the step of advancing the substrate along a predetermined path in a predetermined direction and at a predetermined speed, and the applying step includes vaporizing the metallic material onto the at least one side of the advancing substrate at the predetermined speed and while the substrate advances along a first portion of its path. The bonding step comprises establishing a supply of organic material adjacent a second portion of the path downstream of the first portion, heating the supply to vaporization temperature, and contacting the film with vaporized organic material in the second portion of the path. The heating step can include electrically heating the supply of organic material.

The novel features which are considered as characteristic of the invention are set forth in particular in the appended claims. The improved foil itself, both as to its composition and the method of making the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
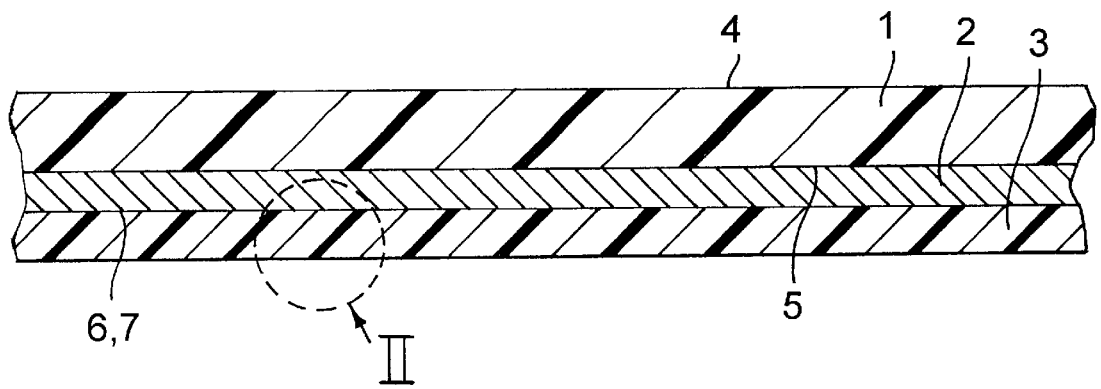
FIG. 1 is an enlarged fragmentary sectional view of a foil which embodies one form of the invention and comprises a single metallic film and a single protective layer for the metallic film.
Figure 2:
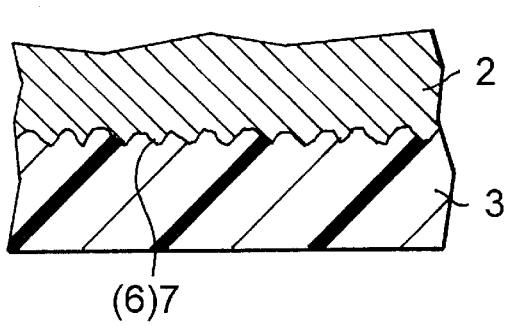
FIG. 2 is a greatly enlarged view of a detail in FIG. 1.

Referring first to FIGS. 1 and 2, there is shown a portion of a foil which includes a plastic carrier or substrate 1, a metallic film 2 which adheres to one side 5 of the substrate and has a surface 6 which faces away from the substrate, and a thin protective layer 3 which adheres to and overlies the entire surface 6 of the film 2. The metallic material of the film 2 is vaporized, sprayed or otherwise applied to the adjacent side 5 of the substrate 1. The organic material of the protective layer 3 can be vaporized onto or otherwise applied to the surface 6 so that the finished layer 3 shields the metallic film 2 from corrosion, mechanical damage and other undesirable influences.

Certain presently preferred materials for the making of the protective layer 3 include natural and synthetic resins, natural and synthetic waxes and certain friction reducing agents (hereinafter called lubricants). For example, the material of the layer 3 can be a synthetic resin for lacquers and varnishes. It is also possible to utilize caoutchouc, a mixture of natural and synthetic resins, a mixture of natural and synthetic waxes or any other mixture of the above-enumerated organic substances (for example, a mixture of a natural or synthetic resin with a natural or synthetic wax).

A synthetic resin which can be used in the protective layer 3 or to make the protective layer is known as "Rotramar/ 887" (produced and distributed by the Firm Krämer, Bremen, Federal Republic Germany). Furthermore, the protective layer 3 can contain or can consist of a wax selected from the group consisting of "Marl kmid" (produced and distributed by Chemische Werke Hülst, Federal Republic Germany), "Westowax AO 1539" (produced and distributed by Hülst), "LCP Wachs" (produced and distributed by BASF), Ludwigshafen, Federal Republic Germany), and "E-Wachs" (produced and distributed by Farbwerke Höchst, Federal Republic Germany).

It is important to ensure that the protective layer 3 be bonded to the surface 6 of the metallic film 2 while the film is still intact, i.e., while the film is still devoid of scratches, scuffs and/or other mechanical defects. This can be readily achieved if the layer 3 is formed immediately or practically immediately following the application of metallic material of the film 2 to the respective side 5 of the substrate 1. One presently preferred mode of forming the layer 3 will be described with reference to FIGS. 6 and 7. It is presently preferred to vaporize the organic material of the layer 3 and to contact successive increments of the surface 6 of the freshly formed film 2 with vapors. As a rule, it is desirable to provide the foil with a thin or extremely thin layer 3 which is preferably of uniform thickness adjacent each and every portion of the surface 6. Such uniform thickness can be readily achieved by appropriate control of vaporization of a supply of organic material and by appropriate control of the establishment of contact between the vaporized organic material and the surface 6 of the film 2. Another advantage of bonding of the layer 3 by contacting the film 2 with vaporized organic material is that the density of the thus obtained layer is high which is desirable in many instances, for example, if the layer 3 is to constitute a barrier against penetration of oxygen and/or vapors into contact with the metallic material of the film 2. Moreover, a dense layer 3 can shield the film 2 from scuffing, scratching and/or other undesirable mechanical influences.

In many instances, an intact metallic film 2 is impermeable to fluids (such as air, water and vapors). Thus, if the film 2 is intact prior to the application of the protective layer 3, it will remain intact even if the layer 3 is permeable to fluids. However, the material of the layer 3 can be readily selected in such a way that the combination of intact film 2 and protective layer invariably prevents penetration of any fluids toward and into contact with the substrate 1 and hence into contact with the material or materials which are to be confined by the improved foil. Therefore, the improved foil can be utilized with advantage for the wrapping or packing of certain types of foodstuffs and cosmetics which should be reliably sealed from oxygen and/or water vapors or which should not be relieved of moisture.

The material of the layer 3 can be selected with a view to satisfy all of the above enumerated requirements as well as to form a strong mechanical barrier adjacent the surface 6 of the film 2. This renders it possible to apply to the film 2 a pronounced force, as long as such force is applied by way of the protective layer 3. Moreover, the layer 3 preferably exhibits a pronounced resistance to blocking so that it does not adhere to an adjacent layer 3 or to the uncoated side of a substrate 1 even if it is acted upon by a considerable force which tends to urge it toward the surface of the film 2.

It is important to select a material which can be vaporized at temperatures below that temperature or below that range of temperatures which could affect the quality of the film 2 and/or substrate 1. Thus, if the material of the layer 3 is to be applied to the surface 6 of the film 2 in vaporized state, the material is preferably vaporizable at temperatures between approximately 100° C. and 150°. The vaporized material deposits and is condensed on the surface 6 of the film 2. A single stratum of vaporized and condensed material often suffices to form a reliable protective layer 3 which is not permeable to oxygen and/or vapors, either alone or jointly with the metallic film 2. However, and as will be explained with reference to FIGS. 6 and 7, the protective layer 3 can consist of two, three or more superimposed strata which are applied in a series of successive stages. Such mode of forming the layer 3 is particularly desirable if successively applied strata of the layer consist, at least in part, of different materials each of which is to enhance a particular characteristic of the finished product.

A material which is a proper combination of two or more different substances can serve as a corrosion preventing or retarding barrier in front of the surface 6 of the metallic film 2. Thus, the material of the layer 3 can be selected to prevent penetration of oxygen and/or vapors toward and into contact with the surface 6 so that the metallic film 2 can merely serve as a reinforcement for the substrate 1 and/or as a decorative part of the foil because the protective layer 3 is capable of intercepting oxygen and/or vapors so that these substances cannot reach the surface 6. Such protective layer can be formed by using a selected natural or synthetic resin, a selected natural or synthetic wax or a combination of two or more natural or synthetic resins and/or waxes. The ability to prevent corrosion of the film 2 is an important characteristic of the protective layer 3. Extensive experiments indicate that the ability of a metallic film to resist penetration of oxygen and/or vapors is greatly affected by corrosion, i.e., corrosion contributes to or causes permeability of the metallic film.

A distinguishing feature of resins is that their molecular weight is not less than about 10,000 g/mol whereas the molecular weight of waxes is less than about 10,000 g/mol. If the protective layer 3 is a mixture of one or more waxes and one or more resins, the resin or resins enhance the resistance of the layer 3 to scuffing and/or other mechanical stresses (such resistance increases if the molecular weight of the selected resin or resins is higher). On the other hand, the wax or waxes in such mixture enhance the flexibility (suppleness) of the protective layer 3. Selection of one or more materials which are to constitute or to form part of the protective layer 3 further depends upon the intended use of the foil. For example, the ratio of natural and synthetic waxes and/or resins will be selected in dependency upon the desired or expected resistance of the layer 3 (or a combination of film 2 and layer 3) to penetration of one or more particular gases and/or vapors as well as in dependency on the environment in which the foil is to be put to use.

Figure 5:
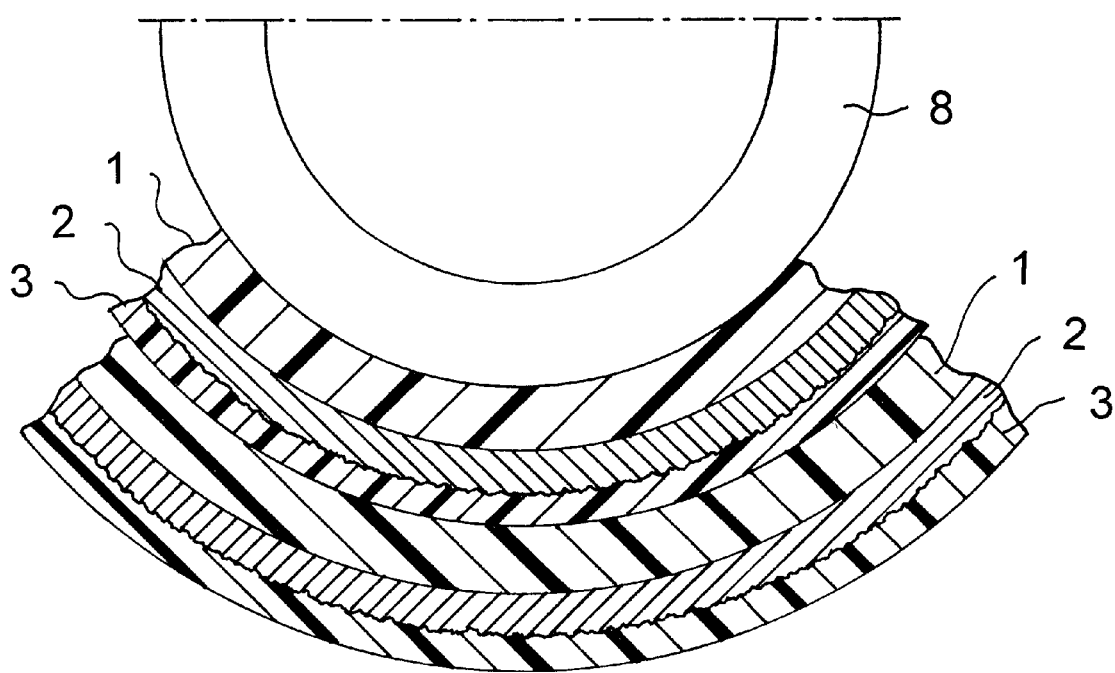
FIG. 5 is a fragmentary sectional view of two convolutions of the improved foil on a core.
Figure 6:
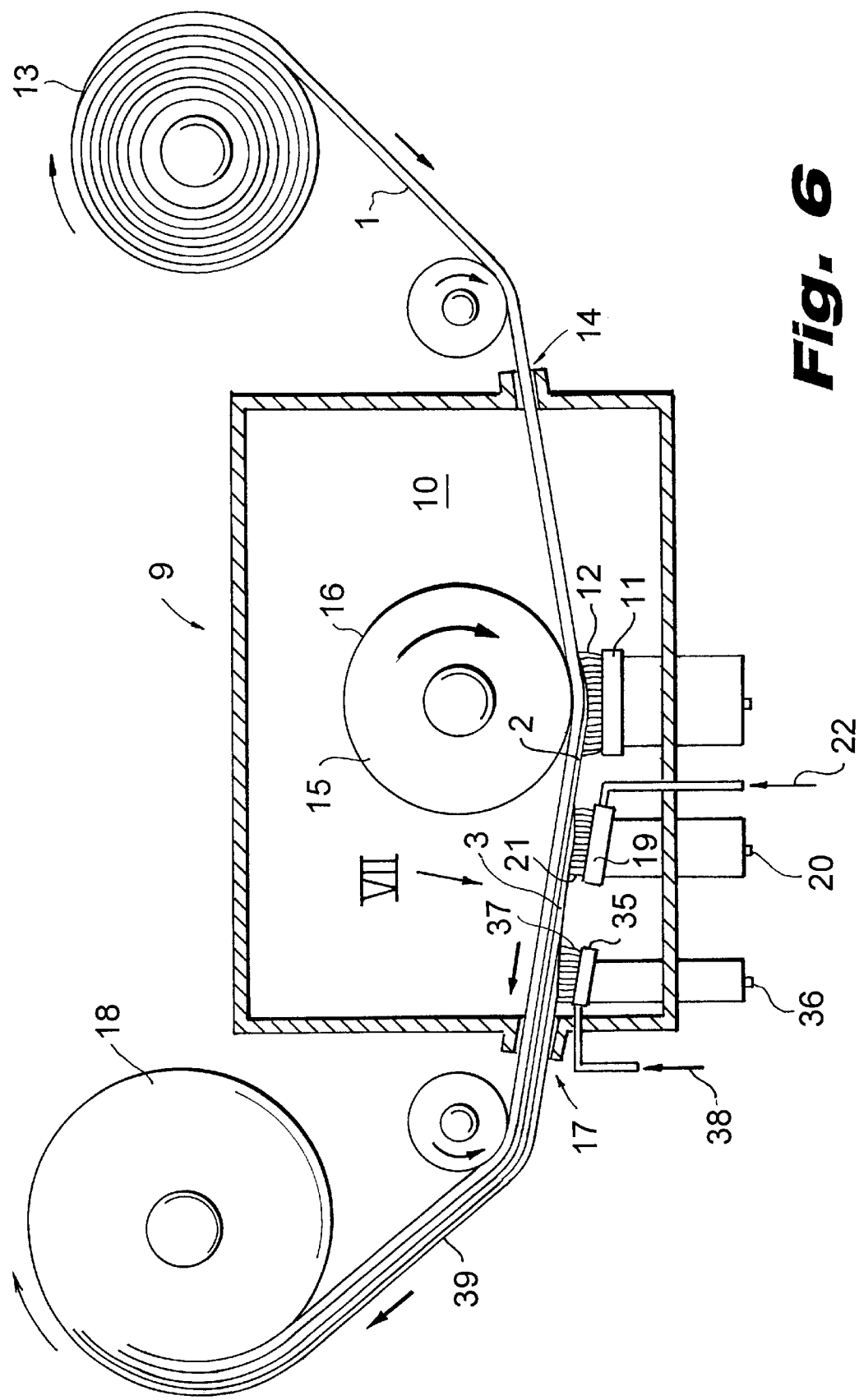
FIG. 6 is a diagrammatic view of an apparatus which can be utilized for the practice of the improved method.

In addition to containing one or more aforementioned materials (such as natural and/or synthetic waxes and/or natural and/or synthetic resins), the protective layer 3 can also contain one or more friction reducing substances which act as lubricants. The addition of one or more lubricants enables the exposed surface of the protective layer 3 to readily slide along the exposed surface of a neighboring layer 3 or along the uncoated side of a substrate 1 or along the adjacent surface of a product which is to be packed or wrapped. FIGS. 5 and 6 show a roll 18 of convoluted foil wherein the exposed surface of the protective layer 3 forming part of an inner convolution is in contact with the uncoated side of the substrate 1 forming part of the neighboring outer convolution. The addition of one or more lubricants ensures that the layer 3 is not damaged as a result of sliding contact with the adjacent substrate 1. The innermost convolution of the roll 18 surrounds a core 8.

The lubricant is selected in such a way that it does not promote the separability of the layer 3 from the surface 6 of the metallic film 2; on the contrary, the selected lubricant or lubricants can enhance the ability of the layer 3 to strongly adhere to the film 2. Moreover, the selected lubricant can enhance the aforediscussed desirable characteristics of the protective layer 3, such as flexibility, resistance to penetration of oxygen and/or vapors, mechanical strength and/or others. The percentage of lubricant in the layer 3 is or can be small so that the addition of lubricant does not contribute to thickness of the layer to any significant extent. The lubricant can but need not constitute the outermost stratum of a protective layer 3 which consists of two or more superimposed strata.

Figure 3:
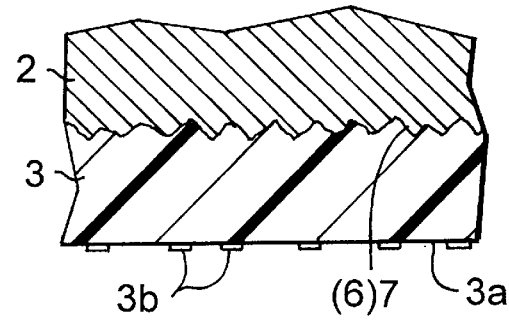
FIG. 3 is an enlarged view similar to that of FIG. 2 and further showing printed matter applied to the exposed side of the protective layer.

Another advantage of a lubricant is that it enables the thus obtained protective layer 3 to constitute a highly satisfactory priming which enhances the ability of the foil to accept and retain printed matter. This is shown in FIG. 3 wherein the exposed surface 3a of the protective layer 3 carries printed matter 3b. FIGS. 1, 2 and 3 further show that the ratio of thicknesses of the metallic film 2 and protective layer 3 need not be fixed. Thus, the thickness of the layer 3 in FIG. 1 matches or approximates the thickness of the metallic film 2. On the other hand, the metallic film 2 which is shown in FIGS. 2 and 3 is thicker than the protective layer 3.

Figure 4:
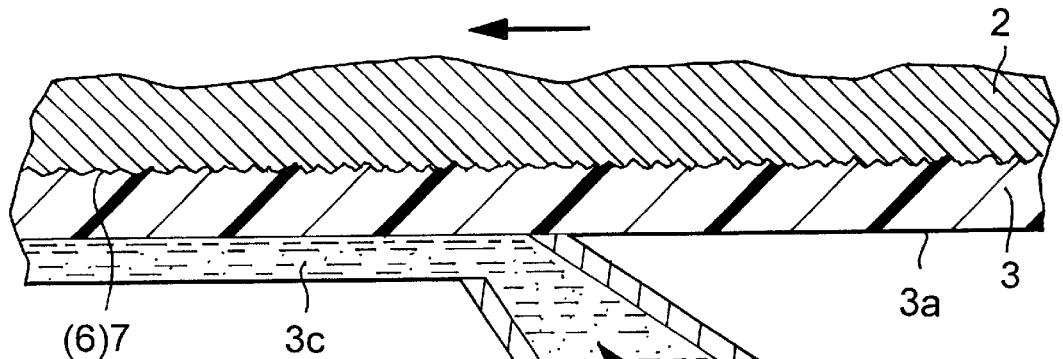
FIG. 4 shows the application of an extruded coating to the exposed side of the protective layer.

The presence of lubricant in the protective layer 3 is often desirable on the additional ground that such protective layer can be more readily bonded to a coating 3c of extruded plastic or other material (see FIG. 4). FIG. 4 further shows that the abutting surfaces of the film 2 and layer 3 can form a number of hills and valleys 7.

As already mentioned above, the protective layer 3 can be selected and bonded to the film 2 with a view to prevent corrosion of the metallic material of the foil. The material of the layer 3 can be selected with a view to prevent corrosion of the film 2 for any desired interval of time, as long as the layer 3 remains at least substantially intact. The constituent or constituents of the layer 3 can be selected with a view to constitute an anticorrosion barrier for a particular metallic material as well as in dependency upon the intended use of the foil and in dependency upon the anticipated mechanical and/or other stressing of the layer 3 in actual use of the foil. The lubricant or lubricants in the layer 3 can be selected in such a way that they do not affect the ability of the layer 3 to prevent corrosion of the metallic film 2; on the contrary, certain lubricants can enhance such ability of the protective layer.

Still further, the material of the protective layer 3 is preferably selected in such a way that it exhibits high affinity for the metallic material of the film 2. Thus, and if the material of the layer 3 is vaporized prior to contacting the surface 6 of the film 2, the vaporized material should exhibit pronounced affinity for the metallic material to thus ensure the establishment of a reliable and lasting bond which will remain intact in actual use of the foil. Moreover, such affinity ensures that the layer 3 overlies and adheres to the entire surface 6 of the metallic film 2 so that the quality of each and every portion of the finished product is equally satisfactory. In addition, such selection of the material of the layer 3 ensures or contributes to uniform application of vaporized material of the layer 3 to the surface 6 of the film 2.

It is further desirable to select the material of the protective layer 3 with a view to ensure that the surface 3a (FIG. 3) of the finished layer can readily accept and retain printed matter 3b which is applied in accordance with available printing techniques. This can be readily achieved if the material of the layer 3 contains one or more organic substances of the above enumerated character, such as one or more natural and/or synthetic resins and/or one or more natural and/or synthetic waxes with or without one or more lubricants. As mentioned above, a properly composed protective layer 3 can serve as a highly satisfactory priming for the printed matter 3b. This renders it possible to dispense with the application of a priming to the exposed surface 3a of the protective layer 3 prior to the application of printed matter 3b. A protective layer 3 can serve as a satisfactory priming for printed matter 3b and/or as an adhesion-promoting substrate for the extruded coating 3c of FIG. 4. Such selection of the protective layer 3 (to serve as a priming for printed matter 3b and/or for the coating 3c) enhances the versatility of the foil and reduces its cost because it is not necessary to apply a specially produced priming over the surface 3a of the layer 3. It has been found that low-molecular olefin waxes are particularly suitable for use in a protective layer 3 which is to serve as an adhesion-promoting priming for an extruded coating 3c.

Still further, the material of the protective layer 3 can be selected with a view to ensure that its surface 3a will accept and retain an adhesive or a solvent which is to be applied preparatory to the making of a laminate including the improved foil and one or more additional sheet-, strip- or web-like materials which are to be bonded to the layer 3. Moreover, the material of the extruded coating 3c should be capable of satisfactory crystallization on the surface 3a of the layer 3. Polyethylene and polypropylene constitute satisfactory substrates for a polyolefin coextrusion.

The material of the protective layer 3 is preferably selected with a view to ensure that it is physiologically acceptable and that it is preferably odorless. Thus, the material of the layer 3 should not affect the quality of the products which are to be wrapped or packed in the improved foil, and such material should not be harmful to human beings and/or animals.

The substrate 1 can be made of a wide variety of materials. Certain presently preferred materials include polypropylene, polyethylene, polyesters, polyamides, polystyrene and polyvinyl chloride.

The layer 3 is preferably thin; its thickness can be in the range of about $0.5\mu$ to about $1/15,000$ mm.

Figure 7:
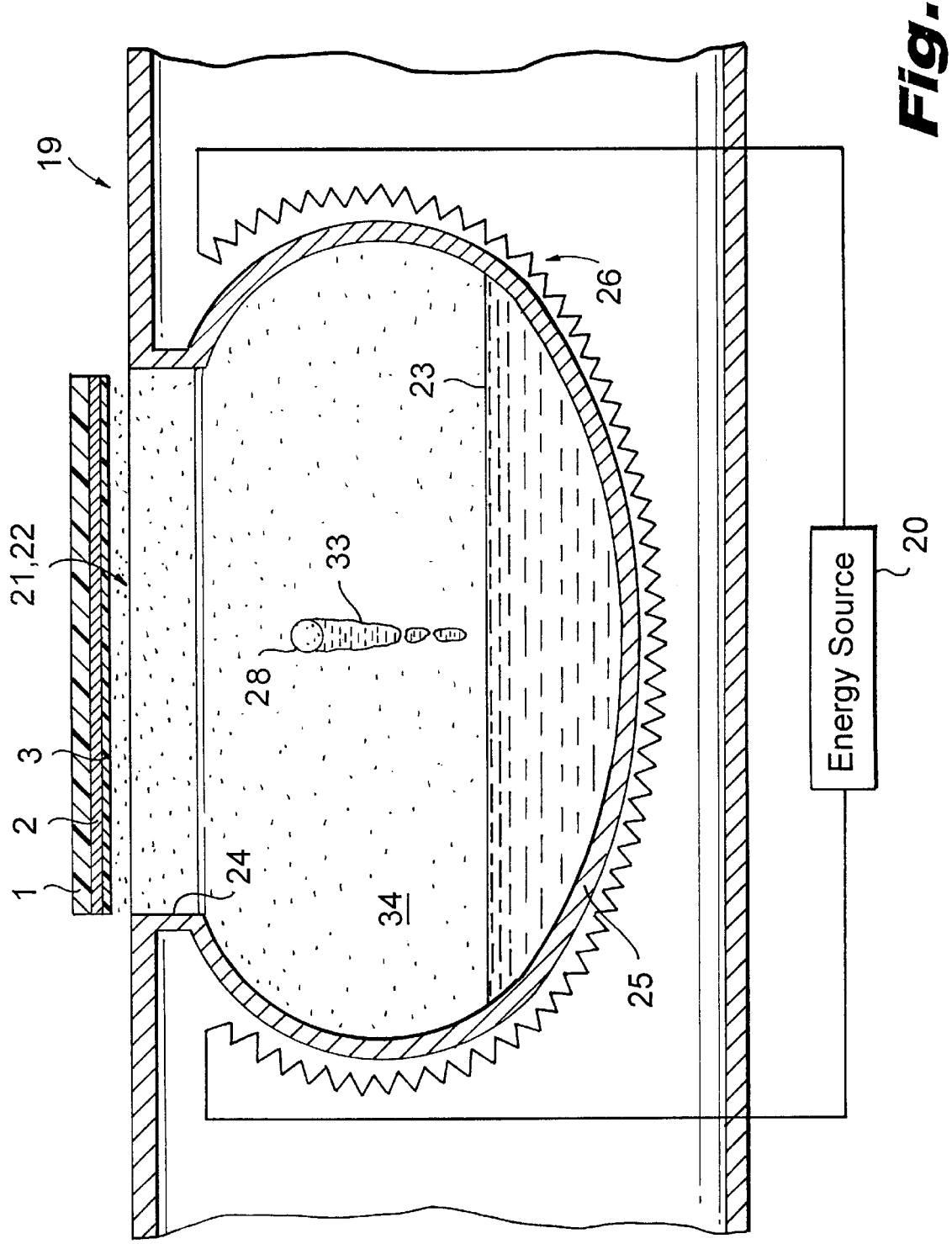
FIG. 7 is an enlarged fragmentary sectional view of that portion of the apparatus which is indicated by the arrow VII, the section being taken in a plane which is parallel to the plane of FIG. 6 and being turned through 180°.

FIGS. 6 and 7 show certain parts of a presently preferred apparatus which can be utilized for the practice of the improved method, i.e., for the making of the improved foil. An organic material 22 (which can be a natural or synthetic wax, a natural or synthetic resin, each with or without a lubricant, or any combination of such materials at a desired ratio) is fed into a vaporizer 19 wherein a heated wall 25 surrounds a bath 23 of organic material 22. The wall 25 is formed with a slot or outlet 24 which enables vapors of organic material 22 to contact successive increments of the film 2 at the underside of a substrate 1 which is advanced in the direction of arrows from a source 13 to the station for the roll 18 of convoluted foil. The vaporizer 19 is installed in a vaporizing unit 9 for metallic material which is to form the film 2. The inlet to the unit 9 is shown at 14, the peripheral surface of a rotary back support 15 for the uncoated side of the substrate 1 is shown at 16, and the character 17 denotes a guide for the substrate 1 and film 2 during advancement past the vaporizer 19 and a second vaporizer 35 downstream of the vaporizer 19. The back support 15 and the guide 17 are installed in the internal chamber 10 of the vaporizing unit 9, and the reference characters 11 and 12 denote standard parts of the unit 9, i.e., of the means for applying the metallic film 2 to successive increments of the underside of the substrate 1 which is advanced at a predetermined speed, namely at a speed which is required to form a film 2 of acceptable quality.

The guide 17 ensures that successive increments of the freshly formed film 2 advance past the slot 24 of the wall 25. The wall 25 is heated by an electric heating element 26 in circuit with an energy source 20 to ensure that the organic material which enters the internal space 34 of the wall 25 at the inlet 28 of a replenishing device 33 is vaporized to an extent which is necessary to provide the surface 6 of the metallic film 2 with a layer 3 of requisite thickness. The cloud or flow of vapors issuing from the internal space 34 of the wall 25 through the slot 24 is shown at 21, and such vapors condense on the surface 6 of the metallic film 2 to form the protective layer 3. The thickness of the layer 3 depends on a plurality of parameters, such as the composition of the bath 23, the rate at which the bath 23 is heated by the heating element 26 (through the medium of the wall 25), the speed of advancement of the substrate 1 from the source 13 toward the roll 18 of convoluted foil, the rate at which the organic material 22 is fed into the bath 23, and others. The rate of feed of organic material 22 and the rate of evaporation of such material in the internal space 34 of the wall 25 are related to the speed of advancement of the substrate 1 and film 2 in order to ensure the formation of a protective layer 3 which has a required thickness and covers the entire surface 6 of the film 2. On the other hand, the speed of movement of the substrate 1 from the source 13 toward the roll 18 depends on the desired thickness of the film 2 which is applied between the back support 15 and the parts 11, 12 of the vaporizing unit 9.

The heating element 26 is designed to heat the wall 25 which, in turn, heats the organic material 22 in the internal space 34 to a temperature above the boiling or melting point so that the bath 23 discharges vapors which rise into the slot 24 in the form of a flow or cloud 21 and are converted into the protective layer 3.

FIG. 6 further shows that the layer 3 can be applied in several successive stages, i.e., such layer can consist of two or more strata one of which overlies the surface 6 of the film 2 and each other of which overlies the previously applied stratum. The second vaporizer 35 is located immediately or closely downstream of the vaporizer 19, and the vaporizer 35 can be followed by one or more additional vaporizers (not shown), depending on the desired number of strata in the layer 3 of the foil which forms the roll 18. The vaporizer 35 receives an organic material 38 which is or which can be different from the organic material 22. The arrangement can be such that the organic material 22 consists of or contains one or more natural and/or synthetic resins whereas the organic material 38 consists of or contains one or more natural and/or synthetic waxes. Alternatively, each of the organic materials 22, 38 can consist of or contain one or more natural and/or synthetic waxes or one or more natural and/or synthetic resins, i.e., the composition of the material 22 can be the same as that of the material 38. The stratum which is applied by the vaporizer 35 is shown at 39. The reference character 36 denotes in FIG. 6 the energy source for the electric heater of the vaporizer 35, and the character 37 denotes the cloud or is flow of vapors which are discharged by the vaporizer 35 to form the stratum 39. It is clear that the vaporizers 19 and 35 can employ a common energy source 20 or 36; in fact, the vaporizer 35 can be identical with the vaporizer 19, and the same applies for one or more additional vaporizers (if used) downstream of the vaporizer 35. If the apparatus of FIG. 6 employs three or more vaporizers, the first, third, etc. vaporizers can receive vaporizable material of a first composition, and the second, fourth, etc. vaporizers can receive vaporizable material of a different second composition.

It is often desirable to place the vaporizers 19 and 35 into close or immediate proximity to each other. This might be desirable and advantageous if the vapors 37 are to contact the material of the preceding stratum before the material of the preceding stratum sets, i.e., the materials which are applied by the vaporizers 19 and 35 can be caused or permitted to mix and to form, a layer 3 which has been produced in several successive stages but its composition is at least substantially homogeneous all the way between the surface 6 of the film 2 and the exposed surface 3a of the finished protective layer. Such layer can serve as a fluidtight barrier against penetration of oxygen and/or vapors into contact with the metallic film 2.

The distance of successive vaporizers from each other will depend on the desired nature of the protective layer 3. Thus, if such layer is to be composed of two or more discrete superimposed strata as the stratum 39 in FIG. 6 the distance of neighboring vaporizers from each other will be increased to lengthen the intervals between the application of successive vaporized organic materials. The length of such intervals can vary between, for example 30 and 120 seconds. The length of intervals will also depend upon the nature of vaporized materials and can be constant from vaporizer to vaporizer or variable, e.g., by increasing or reducing the speed of advancement of the substrate 1 and metallic film 2.

The present invention is based on the recognition that a metallic film which is applied to a substrate is subjected to friction practically immediately following the application of such film to the substrate because, as a rule, the thus obtained foil is rolled onto a core or the like as soon as the application of the metallic film is completed. The neighboring convolutions of a roll 18 of convolutions forming part of a rolled up foil rub against each other and, in the absence of any remedial action, the exposed surface of the metallic film bears against the adjacent side of the substrate, against the adjacent surface of a metallic film or against the surface of a product to be packed or wrapped. Shifting of neighboring convolutions relative to each other can result in a minute displacement in the range of one or more tenths of one millimeter; however, such minor displacements suffice to affect the integrity of the metallic film, i.e., the film is likely to be scuffed and/or otherwise adversely influenced and to thus suffer damage which affects its resistance to penetration of oxygen and/or vapors and/or affects other desirable characteristics. The quality of the metallic film is or can be affected regardless of whether the film is caused to contact another metallic film, the substrate or any other material. The damage to metallic film is or can be minute so that it can be ascertained only as a result of inspection with a microscope; however, such minute damage often suffices to greatly affect certain desirable characteristics of the foil, particularly the ability of the metallic film to prevent the penetration of oxygen and/or vapors therethrough. The exact reasons for an often pronounced drop of impermeability of the metallic film, even in response to minute shifting of neighboring convolutions of a rolled up foil (namely a shifting in the range of one or more tenths of one millimeter) are still unknown. However, it is known that the extent of impermeability or lack of permeability of the metallic film is a function of several parameters including the extent of shifting of neighboring convolutions of the roll of foil relative to each other, the tensional stress upon the convolutions, the diameter of the roll, the roughness of the surface which is in contact with the exposed surface of the metallic film, and certain other factors such as the temperature of vaporized metallic material which is being applied to a substrate, the speed of forward movement of the substrate and the speed of convoluting the metallized substrate onto a core or the like.

The metallic film on a substrate can be damaged during rolling of the foil onto a core as well as during unwinding of the foil and/or during other processing of the normally convoluted foil, e.g., while the foil is being severed into sections of desired size and/or shape. Surprisingly enough, experiments with foils consisting of metallized substrates indicate that the permeability of the metallic film is not dependent upon the thickness of such film.

Heretofore known attempts to reduce the proneness of a foil, wherein a substrate carries a metallic film, to damage as a result of rubbing of the exposed surface of the metallic film against an adjacent surface include the utilization of a friction reducing layer which is applied to the exposed surface of the metallic film. Such experiments have met with quite satisfactory results if the friction reducing layer was applied to the exposed surface of the metallic film prior to conversion of a freshly metallized substrate (i.e., a foil) into a roll of superimposed convolutions. Reference may be had to commonly owned U.S. Pat. No. 4,818,609 granted Apr. 4, 1989 for "Packaging comprising substrate metallic layer and antifriction film". However, such foils also exhibit a number of serious drawbacks. For example, the friction reducing layers of presently known composition contribute significantly to the overall thickness of the foil. The reason is that heretofore known materials which are used to make friction reducing coatings cannot be applied in a manner to ensure that they do not significantly increase the thickness of the foil, i.e., the combined thickness of a substrate, a metallic film and a friction reducing layer or coating. This prevents the thus obtained foil from being utilized in a number of fields, particularly in connection with the wrapping or packing of certain foodstuffs and/or cosmetics. Moreover, heretofore known layers which are intended to reduce friction between neighboring layers of a foil and/or between a foil and a material to be packed or wrapped are not capable of ensuring convenient application of printed matter by resorting to heretofore known printing procedures. The same applies when a foil which is provided with a conventional friction reducing layer is to be laminated with a further foil or with any other sheet-, web- or strip-like material and/or when a coating is to be extruded onto the friction reducing layer. Therefore, the makers of metallized substrates often desist from utilizing a friction reducing layer on top of the metallic film in spite of the aforediscussed advantages of such layers. The reason is that the application of a conventional friction reducing layer limits the fields of application of the foils and also that the application of a conventional friction reducing layer contributes significantly to the cost of the foil. The cost is increased because it is very difficult to control the application of a conventional friction reducing layer in such a way that the layer does not contribute significantly to the thickness of the thus obtained foil. Moreover, if the thickness of the friction reducing layer exceeds a certain value, the layer is likely to peel off the adjacent surface of the metallic film so that the metallic film is exposed to the action of oxygen, water vapors and/or other undesirable influences.

The improved foil exhibits a number of important advantages. Thus, the protective layer 3 shields the metallic film 2 even before the web or strip including the substrate 1 and the metallic film 2 is converted into a roll 18, and the layer 3 also protects the film 2 during each and every stage of unwinding of the foil from the roll 18, during subdivision of the foil into sections of desired size and/or shape as well as in actual use as a packaging, wrapping or like material. The film 2 is protected from scuffing, chafing and/or other mechanical damage, and its flexibility is not affected by the protective layer since the latter can be more readily flexible than the film 2 and/or the substrate 1. The film 2 remains impermeable to fluids, either because it is shielded from mechanical damage or because its resistance to penetration of gases and/or other fluids is enhanced by the protective layer 3.

Another important advantage of the improved foil is that the material of the protective layer 3 can be readily selected and applied in such a way that the layer exhibits no tendency to become separated from the metallic film 2, even if the thickness of the layer matches or exceeds the thickness of the film. Since the flexibility of the layer 3 can be determined in advance by appropriate selection of the material or materials which are to be bonded to the surface 6 of the metallic film, the finished foil can exhibit a desired flexibility which is best suited for unwinding from the roll 18, for severing and/or for conversion into packages of desired size and/or shape.

Still further, the metallic film 2 can remain intact for any desired period of time because it is not subjected to the corrosive action of oxygen and/or vapors. All that is necessary is to ensure that the protective layer 3 is applied before the exposed surface 6 of the metallic film 2 is subjected to any rubbing, scuffing, grinding or other mechanical action which would be likely to render it permeable to fluids. In fact, if the layer 3 is applied before the foil is converted into a roll 18, the layer 3 contributes to a reduction of friction between neighboring convolutions of the roll 18 so that the likelihood of excessive mechanical stressing of the film 2 and/or of the layer 3 is even more remote. Moreover, and since the layer 3 strongly adheres to the surface of the metallic film 2, even pronounced pressures between neighboring convolutions of the roll 18 cannot result in separation of the layer from the film and/or in mechanical damage to the layer and/or film. This holds true even if the protective layer is extremely thin, e.g., in the range of one or more hundredths of one micron. The provision of a relatively thin protective layer is desirable and advantageous in many or most instances because this entails savings in the material of the protective layer, a reduction of the thickness of the foil and a reduction of the dimensions of the roll 18. The nature of the method of bonding the layer 3 to the surface 6 of the metallic foil 2 can be readily selected in such a way that it is not even necessary to continuously monitor the thickness of the applied protective layer. This, too, contributes to simplicity and lower cost of the improved method and apparatus as well as to lower cost of the finished product.

Though it is possible to make the protective layer of a material other than an organic material, organic materials (including the above-enumerated waxes, resins and lubricants) are preferred at this time because such organic materials are relatively inexpensive, they can be selected to exhibit pronounced affinity for the metal of the film 2, and they are effective as protective layers even if their thickness is minimal. Moreover, it is not necessary to monitor the application of protective layer to the film 2 with a high degree of accuracy because, though it is preferred to apply a protective layer of predetermined constant thickness, fluctuations of the thickness of the protective layer are of no great importance as long as the layer covers the entire surface 6 of the metallic film 2.

The utilization of a lubricant as a constituent of the material of the protective layer 3 constitutes an optional but often highly desirable and advantageous feature of the improved method and of the improved foil. However, care should be taken to ensure that the protective layer 3 which contains a lubricant will not exhibit the drawbacks of aforediscussed friction reducing layers which are utilized on the metallic films of certain conventional foils. Thus, the lubricant should be selected in such a way that it does not tend to smear the surface of an adjacent foil, metallic film or product to be wrapped or packed. Lubricants which are applied directly to the metallic films of conventional metallized substrates often exhibit a pronounced tendency to smearing. Lubricants which are present in the protective layer 3 can be readily distributed in the other material or materials of the layer 3 in such a way that they can perform their friction reducing function but are incapable of smearing the surfaces of adjacent foils and/or other parts. In fact, the aforementioned organic materials of the protective layer 3 (including natural and synthetic resins and/or natural and synthetic waxes) often exhibit highly satisfactory friction reducing characteristics so that the utilization of a typical lubricant (i.e., of a substance which is to be utilized solely on account of its friction reducing characteristics) can be dispensed with.

The protective layer 3 is capable of taking up all mechanical and/or other stresses which are applied directly to the metallic films of many heretofore known foils. This contributes significantly to the useful life as well as to impermeability and/or other desirable characteristics of the metallic foil. Furthermore, the protective layer 3 prevents direct contact between the metallic foil 2 and the product or products to be packed, wrapped and/or otherwise protected by the improved foil, a feature which is often highly desirable and advantageous, for example, when the improved foil is to contact a substance containing acids or other ingredients which are likely to attack the metallic film.

The toughness of the protective layer 3, including the resistance to scratching, tearing, scuffing and/or other influences can be selected practically at will by the simple expedient of selecting the thickness and/or the composition of the protective layer. It has been found that a protective layer 3 which contains or consists of an artificial resin is especially suited to ensure the establishment of a highly reliable intimate bond between the protective layer and the surface 6 of the metallic film 2. On the other hand, a protective layer which contains one or more natural resins can be used with particular advantage when the improved foil is to be employed as a packing or wrapping material for foodstuffs; such protective layers exhibit a highly satisfactory flexibility and a highly satisfactory resistance to scuffing and other mechanical influences.

The lubricants which are to be utilized as constituents of the protective layer can include various oils, greases, graphite and/or others. These lubricants can be selected in such a way that they reduce friction between the layer 3 and a neighboring layer as well as that they contribute to the corrosion-preventing or corrosion-reducing characteristics of the protective layer.

As mentioned above, the metallic film 2 can be applied to the substrate 1, and the protective layer 3 can be bonded to the surface 6 of the metallic film 2, in any well known manner as long as the selected procedures ensure proper adherence of the film to the substrate and to the protective layer. Vaporization of metallic material preparatory to making of the film 2, and vaporization of the material or materials of the protective layer prior to bonding to the surface 6 of the film 2 are preferred at this time because they permit simple, inexpensive and reliable regulation of the thickness of the film 2 and of the layer 3 as well as proper adherence of the film to the substrate and proper bonding of the layer 3 to the metallic film. All that is necessary is to control the speed of advancement of the substrate 1 past the metallizing station and to control the temperature and/or other parameters of the material or materials which are to form the protective layer 3.

The lubricant in the protective layer of the improved foil can be the same as that disclosed in the aforementioned commonly owned U.S. Pat. No. 4,818,609, and the methods of bonding the protective layer 3 to the surface 6 of the metallic film 2 can be the same as those discussed in the aforementioned commonly owned patent for the application of antifriction film to the metallic layer.

EXAMPLE 1

A substrate of polyethylene was provided with a film of aluminum in a standard vaporizing unit. A vaporizer (such as 19) was used in the vaporizing unit for metallic material to apply a protective layer to successive increments of the freshly formed metallic film. The material of the protective layer was a readily meltable resin which was heated in the vaporizer to a temperature of 210° C. This resulted in the development of vapors which were directed against the exposed surface of the metallic film. Condensation of such vapors on the film resulted in the development of a protective layer with a thickness of about $0.5\mu$. The resin was of the type known as PENTALYN 255 which is produced by Hercules Inc., Wilmington, Del. The thickness of the protective layer was uniform, and such layer covered the entire exposed surface of the metallic film, i.e., that surface which faces away from the substrate. Cooling of the vapors on the surface of the metallic film was practically instantaneous so that the thus obtained foil was ready for conversion into a roll of superimposed convolutions without in any way affecting the integrity of the protective layer.

EXAMPLE 2

A running substrate of polyethylene was provided with a film of aluminum at a customary temperature and pressure. The application of metallic film was immediately followed by the application of vaporized organic material, namely a resin known as PEXIGRUM M 527 which is produced and sold by Röhm GmbH, Darmstadt, Federal Republic Germany. The organic material was heated to a temperature of 235° C. and the thus developed vapors were caused to contact the exposed surface of the aluminum film. The thus obtained protective layer adhered firmly to the aluminum film and had a thickness of approximately $0.4\mu$. The hardness correction of the protective layer was sufficient to permit conversion of the foil into a roll immediately following the formation of the protective layer.

EXAMPLE 3

A substrate of polyester was provided with a film of aluminum in a vaporizing unit at a customary temperature and pressure. A protective layer of organic material was bonded to the exposed surface of the aluminum film immediately after completion of application of aluminum to one side of the substrate. The organic material was a mixture of a resin of the type known as HALLOLYN 104 which is produced by Hercules Inc., Wilmington, Del. and a wax known as E-Wachs 20R 6149 produced by BASF. The ratio of resin to wax in Athe material which was used to form the protective layer was approximately nine-to-one. The two ingredients were mixed in a single vaporizer and were heated to vaporization temperature to develop vapors which were contacted by successive increments of the freshly applied aluminum film. The flexibility of the protective layer containing HALLOLYN 104 and E-Wachs 20R was improved by applying first a stratum of wax in a first vaporizer directly onto the aluminum film and by thereupon applying in a second vaporizer a second stratum of resin over the stratum of wax. The second stratum was applied prior to complete setting of the material of the stratum of wax.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A foil having two substantially parallel surfaces, comprising: a substrate having a first side at one of said surfaces and a second side; a metallic film vaporized onto and adhering to said second side of said substrate, said metallic film being devoid of defects; and a protective layer having a first side completely covering said film and a second side facing away from said film, said layer and said film together constituting a coating at the second side of said substrate that is fluidtight against at least one of liquids and gases, and said layer: (a) being vaporized onto the film immediately following vaporization of the film onto said substrate while said film is devoid of defects, (b) having an affinity for the metal of said film, (c) having a thickness between about $0.5\mu$ and about $1/15,000$ mm, (d) being an organic material which is at least one of a natural resin, a synthetic resin, a natural wax, or a synthetic wax, (e) being substantially non-smearing.

2. The foil of claim 1, wherein said organic material has a molecular weight of at least about 10,000 g/mol.

3. The foil of claim 1, wherein said organic material is a priming which facilitates the application of printed matter to said layer.

4. The foil of claim 1, wherein said layer is corrosion-resistant.

5. The foil of claim 1, wherein said layer has a constant thickness along the entire film.

6. The foil of claim 1, wherein said layer is substantially non-blocking.

7. The foil of claim 1, wherein said layer consists of an imprintable material.

8. The foil of claim 1, further comprising a second coating which overlies and adheres to said layer.

9. The foil of claim 8, wherein said second coating is an extrusion which is crystallized on and uniformly covers said layer.

10. The foil of claim 1, wherein said layer consists of material physiologically substantially harmless to humans.

11. The foil of claim 1, wherein said layer is odorless.

12. The foil of claim 1, wherein said substrate consists of a material selected from the group consisting of polypropylene, polyethylene, polyesters, polyamides, polystyrene and polyvinyl chloride.

13. The foil of claim 1, wherein said layer inhibits sliding friction.

14. The foil of claim 1, wherein said layer shields the film from scuffing.

15. The foil of claim 1, wherein said organic material has a molecular weight of less than about 10,000 g/mol.

16. A process for manufacturing a foil having two substantially parallel surfaces and including a substrate having a first side at one of said surfaces and a second side, comprising the steps of:

vapor depositing a metallic film onto said second side of said substrate, said metallic film being devoid of defects; and vapor depositing a protective layer on to said film, while said metallic film is devoid of defects, said protective layer having a first side completely covering said film and a second side facing away from said film, said layer and said film together constituting a coating at the second side of said substrate that is fluidtight against at least one of liquids and gases, said layer (a) having an affinity to the film, (b) having a thickness between about $0.5\mu$ and about $1/15,000$ mm, (d) being an organic material which is at least one of a natural resin, a synthetic resin, a natural wax, or a synthetic wax, and (e) being substantially non-smearing.

17. The process of claim 16, wherein said organic material has a molecular weight of at least about 10,000 g/mol.

18. The process of claim 16, wherein said organic material is a priming which facilitates the application of printed matter to said layer.

19. The process of claim 16, wherein said layer is corrosion-resistant.

20. The process of claim 16, wherein said layer has a constant thickness along the entire film.

21. The process of claim 16, wherein said layer is substantially non-blocking.

22. The process of claim 16, wherein said layer consists of an imprintable material.

23. The process of claim 16, further comprising the step of depositing a second coating on to the second side of said layer.

24. The process of claim 23, wherein said second coating is an extrusion which is crystallized on and uniformly covers said layer.

25. The process of claim 16, wherein said layer consists of material physiologically substantially harmless to humans.

26. The process of claim 16, wherein said layer is odorless.

27. The process of claim 16, wherein said substrate consists of a material selected from the group consisting of polypropylene, polyethylene, polyesters, polyamides, polystyrene and polyvinyl chloride.

28. The process of claim 16, wherein said layer inhibits sliding friction.

29. The process of claim 16, wherein said layer shields the film from scuffing.

30. The process of claim 16, wherein said organic material has a molecular weight of less than about 10,000 g/mol.

* * * * *